United States Patent
Beardsley

(10) Patent No.: US 7,280,685 B2
(45) Date of Patent: Oct. 9, 2007

(54) OBJECT SEGMENTATION FROM IMAGES ACQUIRED BY HANDHELD CAMERAS

(75) Inventor: Paul A. Beardsley, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1043 days.

(21) Appl. No.: 10/294,050

(22) Filed: Nov. 14, 2002

(65) Prior Publication Data

US 2004/0095484 A1 May 20, 2004

(51) Int. Cl.
*G06K 9/00* (2006.01)
(52) U.S. Cl. ...................................... 382/154
(58) Field of Classification Search ............... 382/154; 345/420, 413
See application file for complete search history.

(56) References Cited

U.S. PATENT DOCUMENTS

| | | | |
|---|---|---|---|
| 6,259,827 B1 * | 7/2001 | Nichani | 382/291 |
| 6,587,104 B1 * | 7/2003 | Hoppe | 345/423 |
| 6,792,140 B2 * | 9/2004 | Matusik et al. | 382/154 |

OTHER PUBLICATIONS

Matusik, Wojciech et al. 2000. Image-Based Visual Hulls. SIGGRAPH, New Orleans LA (http://people.csail.mit.edu/wojcuech/IBVH/ibvh.pdf).*

Morse, Bryan S. Lecture 18: Segmentation (Region Based). Brigham Young University☐☐(http://rivit.cs.byu.edu/650/W03/lectures/lect18/region.pdf).*

Nishino, K., Y. Sato, and K. Ikeuchi, "*Eigen-Texture Method: Appearance Compression based on 3D Model*," Proc. of Computer Vision and Pattern Recognition, 1:618-624, 1999.

Pulli, K., M. Cohen, T. Duchamp, H. Hoppe, L. Shapiro, and W. Stuetzle, "*View-based Rendering: Visualizing Real Objects from Scanned Range and Color Data*," Proceedings of the 8th Eurographics Workshop on Rendering, pp. 23-34, 1997.

Toyama et al., "*Wallflower: Principles and Practice of Background Maintenance*," Proceedings of the International Conference on Computer Vision, pp. 255-261, 1999.

* cited by examiner

*Primary Examiner*—Vikkram Bali
(74) *Attorney, Agent, or Firm*—Dirk Brinkman; Clifton D. Mueller; Gene V. Vinokur

(57) ABSTRACT

A method determines a shape of an object in from an image. A visual hull larger than the object is constructed such that the object can be entirely contained within the visual hull. An image is acquired of the object by a camera. The visual hull is projected onto the image according to a position and pose of the camera.

Seed pixels in the image are selected. The seed pixels are located on the projected visual hull, and a region is grown around each seed pixel. Each region includes neighboring pixels resembling the seed pixel. Then, the visual hull is reduced in size according to the grown regions to determine a two-dimensional shape of the object. When multiple images are used from different points of view, the three-dimensional shape can be determined.

13 Claims, 2 Drawing Sheets

OBJECT SEGMENTATION FROM IMAGES ACQUIRED BY HANDHELD CAMERAS

FIELD OF THE INVENTION

The invention relates generally to computer vision, and more particularly to segmenting objects from images.

BACKGROUND OF THE INVENTION

In the field of computer graphics and computer vision, there is a need to build accurate three-dimensional (3D) models that can be used in virtual reality walk-through, animation, solid modeling, visualization, multimedia, and object detection and recognition.

Three-dimensional digitizers are frequently used to generate models from real world objects. Considerations of resolution, repeatability, accuracy, reliability, speed, and ease of use, as well as overall system cost, are central to the construction of any digitizing system. Often, the design of a digitizing system involves a series of trade-offs between quality and performance.

Traditional 3D dimensional digitizers have focused on geometric quality measures for evaluating system performance. While such measures are objective, they are only indirectly related to an overall goal of a high quality rendition. In most 3D digitizer systems, the rendering quality of the models is largely a result of range accuracy in combination with the number of images acquired of the object.

Prior art digitizers include contact digitizers, active structured-light range-imaging systems, and passive stereo depth-extraction. For a survey, see Besl "*Active Optical Range Imaging Sensors*," Advances in Machine Vision, Springer-Verlag, pp. 1-63, 1989.

Laser triangulation and time-of-flight point digitizers are other popular active digitizing approaches. Laser ranging systems often require a separate position-registration step to align separately acquired scanned range images. Because active digitizers emit light onto the object being digitized, it is difficult to capture both texture and shape information simultaneously. This introduces the problem of registering the range images with textures.

In other systems, multiple narrow-band illuminates, e.g., red, green, and blue lasers, are used to acquire a surface color estimate along lines-of-sight. However, this is not useful for capturing objects in realistic illumination environments.

Passive digitizers can be based on single cameras or stereo cameras. Passive digitizers have the advantage that the source images can be used to acquire both shape and texture, unless the object has insufficient texture.

Image-based rendering systems can also be used, see Nishino, K., Y. Sato, and K. Ikeuchi, "*Eigen-Texture Method: Appearance Compression based on 3D Model*," Proc. of Computer Vision and Pattern Recognition, 1:618-624, 1999, and Pulli, K., M. Cohen, T. Duchamp, H. Hoppe, L. Shapiro, and W. Stuetzle, "*View-based Rendering: Visualizing Real Objects from Scanned Range and Color Data*," Proceedings of the 8th Eurographics Workshop on Rendering, pp. 23-34, 1997. In these systems, images and geometry are acquired separately with no explicit consistency guarantees.

In image-based vision systems, there are two basic tasks to be performed. The first task is to determine the position of the camera, assuming the intrinsic parameters are known. Methods for calibrating intrinsic parameters are well known. A method for calibrating rigid multi-camera systems is described by Beardsley in U.S. patent application Ser. No. 09/923,884 "Hand-Held 3D Vision System" filed on Aug. 6, 2001, incorporated herein by reference.

The second task of the vision system is to use the images in conjunction with the known camera positions to extract accurate shape information. Typically, the shape of an object is determined from the pixels imaging the object. Thus, it becomes necessary to identify these pixels in the images. This is called object segmentation.

The most successful object segmentation methods make use of a background image in which the object is not present, followed by background subtraction. Typically, pixel intensities in foreground images are subtracted from corresponding pixels in the background image to generate a differential image. The background image can be acquired ahead of time when it is known that there are no foreground objects in the scene. Any pixels with a low intensity value in the differential image are considered to be part of the background, and pixels with higher values are presumed to part of the object. For a survey of background subtraction methods, see Toyama et al., "*Wallflower: Principles and Practice of Background Maintenance*," Proceedings of the International Conference on Computer Vision, pp. 255-261, 1999.

Typically, prior art segmentation methods make use of controlled cameras with a controlled background. For example, a camera is directed at an object on a turntable with known angular positions and a known background. The background might be a known color, or an active display showing known patterns/colors. These type of systems are cumbersome and expensive to operate.

Therefore, it is desired to perform segmentation with inexpensive handheld cameras in uncontrolled environments.

SUMMARY OF THE INVENTION

The invention provides a method for determining a shape of an object from an image. A visual hull larger than the object is constructed such that the object can be entirely contained within the visual hull. An image is acquired of the object by a camera. The visual hull is projected onto the image according to a position and pose of the camera.

Seed pixels in the image are selected. The seed pixels are located on the projected visual hull, and a region is grown around each seed pixel. Each region includes neighboring pixels resembling the seed pixel. Then, the visual hull is reduced in size according to the grown regions to determine a two-dimensional shape of the object. When multiple images are used from different points of view, the three-dimensional shape can be determined.

DETAILED DESCRIPTION OF THE PREFERRED EMBODIMENT

System Structure

Figure 1:
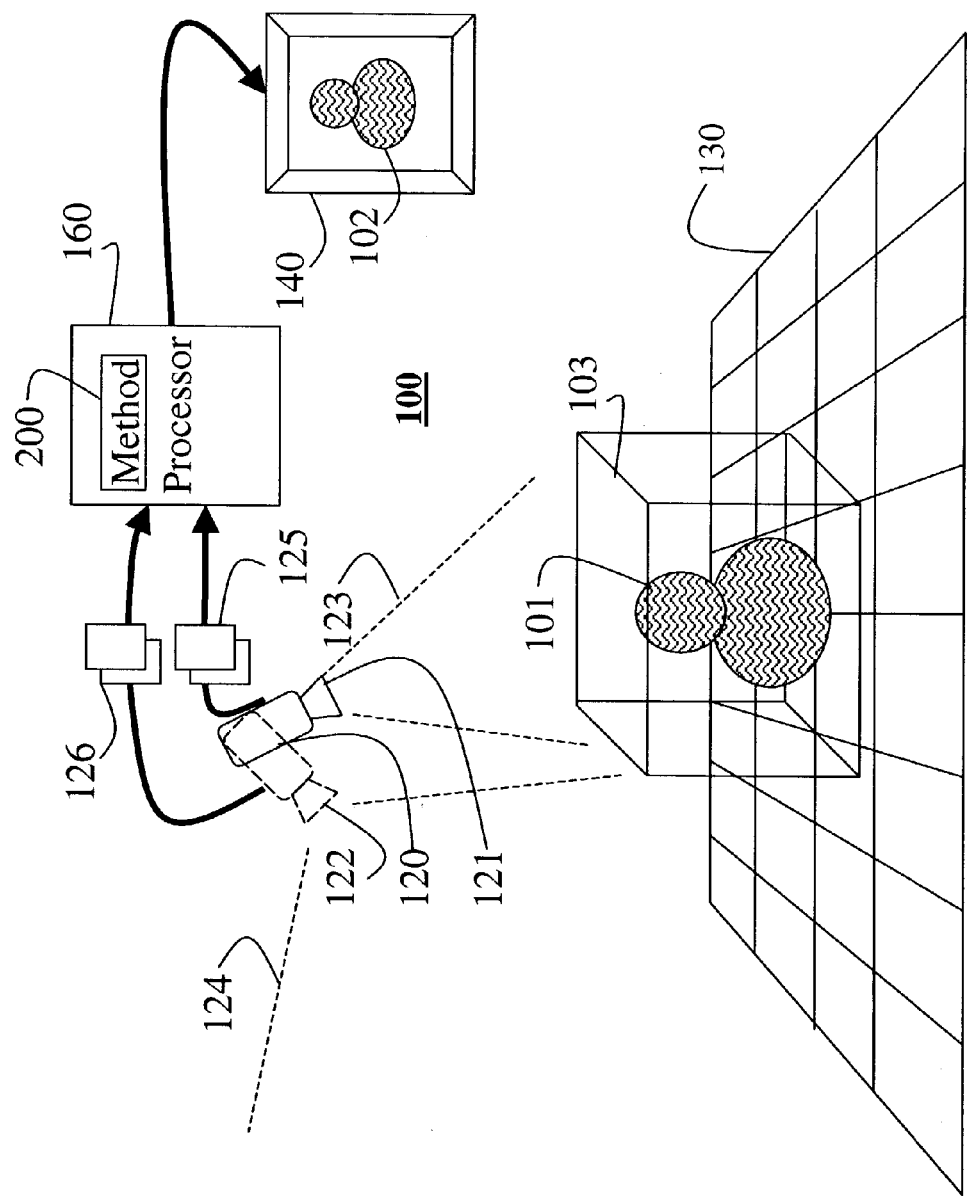
FIG. 1 is a schematic of a system for segmenting an object from images acquired by handheld cameras according to the invention.
Figure 2:
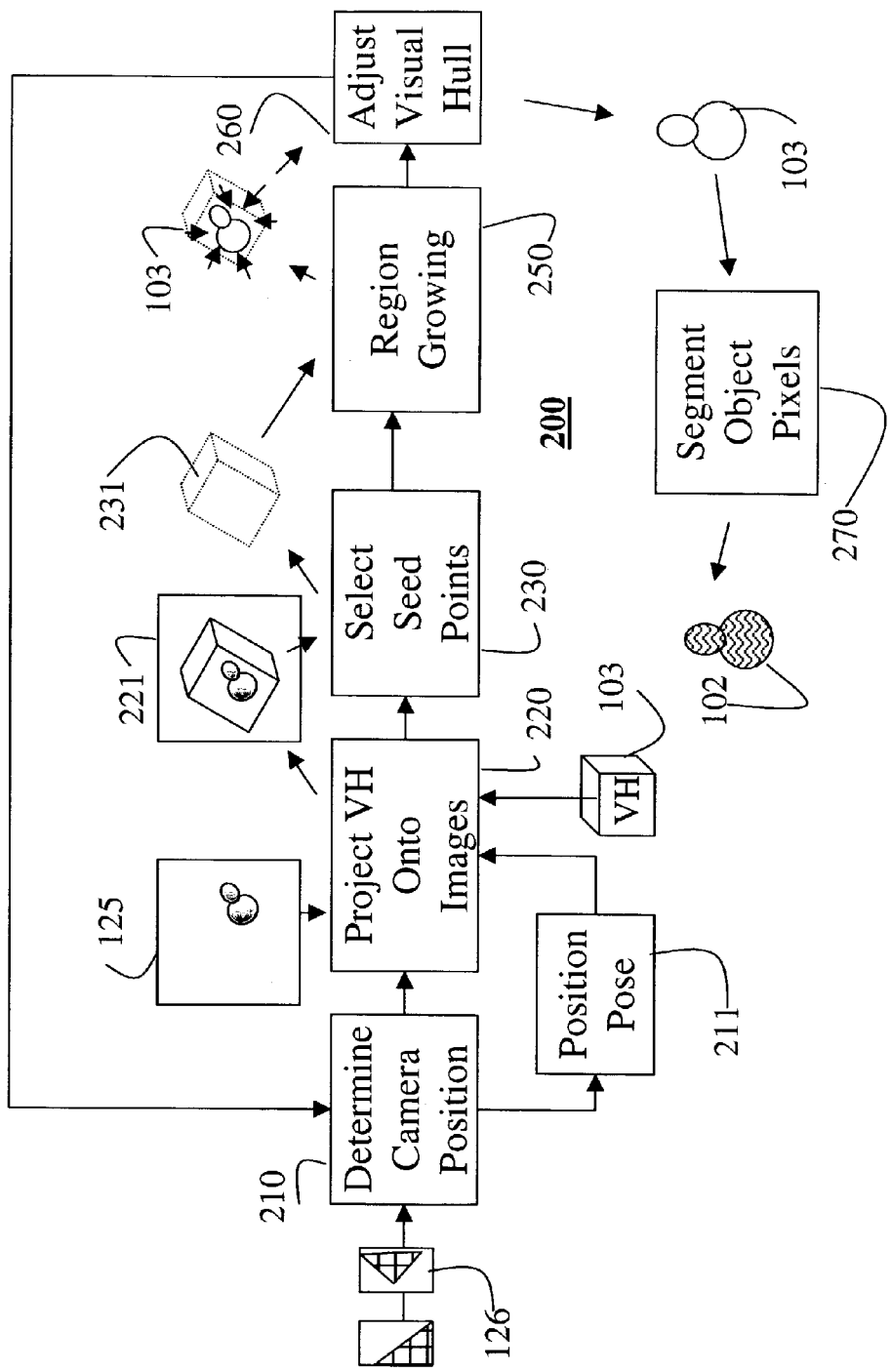
FIG. 2 is a flow diagram of a method for segmenting an object from images acquired by handheld cameras according to the invention.

FIGS. 1 and 2, respectively, show a system 100 and method 200 for segmenting an object 101 from images of a scene acquired with handheld cameras 120 according to our invention to generate a 3D model 102 of the object suitable for rendering on an output device 140. The cameras 120 includes a shape camera 121 and an optional a position camera 122. A portion of the scene includes a known background 130.

The shape camera 121 is used only for determining a shape of the object 101, and therefore a narrow field 123 of view is preferred to get accurate shape data. The position camera 122 can be for determining the position (including pose) of the shape camera, and therefore a wide field of view 124 is preferred. It should be understood that many conventional techniques for determining the position and pose of the shape camera are known. Using the position camera provides a novel extension to prior art techniques.

The field of views 123-124 of the cameras, if two are used, do not need to overlap, as in traditional stereoscopic cameras. The fields of view can be disjoint, and the object does not need to placed in front of the background 130. In fact, the images of the object and the background can be completely disjoint. The cameras 120 are rigidly coupled to each other and calibrated, see Beardsley above. In other words, the spatial relationship between the position and shape cameras is predetermined.

The system 100 also includes a conventional processor 160, coupled to the cameras 120, with memory and I/O devices for implementing the method 200 according to the invention. The method 200 defines an initial approximate visual hull (VH) 103 for the object. For simplicity, the initial shape of the visual hull 103 can be defined parametrically as, e.g., a cube or hemisphere, in a memory. That is, the visual hull can be relatively simple. The only requirement is the object 101 can be entirely contained within the visual hull 103.

System Operation

During operation, a user scans the object 101 from different directions, top, front, back, sides, etc. The scanning is done by acquiring images 125-126. The shape camera 121 is aimed in the general direction of the object 101, and the position camera is aimed in the general direction of the background 130. Note, the shape camera does not need to view any of the known background 130, and the position camera does not need to view the object 101 at all. As stated before, position determination can be performed using other techniques. Thus, the number of views that can be obtained of the object is relatively unconstrained when compared with prior art studio-type systems.

The shape images 125 are processed as shown in FIG. 2. The position images 126, or other known means, are used to determine 210 the position and pose 211 of the shape camera 121 having the predetermined spatial relationship to each other. This information is used to project 220 the visual hull 103 onto the shape images 125, see 221.

Next, pixels 231 in the shape images 125 that are on the projected visual hull 103 are selected 230 as seed points. Region growing 250 is applied, with each seed point. Region growing is well known.

Starting from a seed point, neighboring pixels are accepted into the region providing they meet some predetermined resemblance criterion, and the process continues recursively on the newly accepted points. The preferred resemblance criterion for accepting pixels into a region is gradient-based. First, the gradient magnitude of the seed pixel is tested and region growing proceeds only if this gradient is less than a predetermined threshold. Second, if the gradient magnitude of a neighboring pixel is less than the predetermined threshold, it is added to the region, and the process continues recursively for all seed pixels.

The presumption is that region growing does not cross the surface of the object in the image, because surface pixels of the object have a gradient magnitude greater than the threshold.

When region growing has been completed for all the seed points, accepted pixels can be assumed to be external to the object and part of the background, because the seed points are external to the object, and the grown region contains no image gradients. Last, the visual hull 103 is reduced in size according to the grown regions to approach the shape of the object 101.

These steps are repeated for all seed points of images until the shape of the visual hull stabilizes. At this point the visual hull 103 conforms substantially to the shape of the object 101, and the final visual hull 103 can be used for object segmentation.

The basic assumption is that the surface of the object is associated with an image gradient, so that region growing never proceeds into the object itself. A conservatively low threshold for detection of image gradients is used to ensure this. The goal is always to overestimate the initial silhouette of the object, and never to underestimate it. Against a strongly textured background, it may be that the region growing has very little effect. However, in a scanning strategy with thousands of images, the visual hull will eventually conform to the object's surface.

In a variation, a better estimate of the initial visual hull can be made by applying background subtraction to any images that contain portions of both the object and the background 130. This rough estimate can then be enlarged to overestimate the shape of the object.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for determining a shape of an object in an image, comprising:

constructing a visual hull for an object such that the object can be entirely contained within the visual hull, in which the visual hull is approximate;

acquiring a shape image of the object with a camera;

projecting the visual hull onto the shape image according to a position and pose of the camera; and reducing the projected visual hull in size to conform substantially to a shape of the object in the shape image.

2. The method of claim 1 further comprising:

acquiring, projecting, and reducing for a plurality of shape images from a plurality of points of view to determine a three dimensional shape of the object.

3. The method of claim 1 further comprising:

segmenting the object from the shape image according to the reduced size visual hull.

4. The method of claim 1, wherein the camera has a narrow field of view.

5. The method of claim 1, wherein an initial shape of the visual hull is parametrically defined.

6. The method of claim 5 wherein the initial visual hull is a cube.

7. The method of claim 5 wherein the initial visual hull is a sphere.

8. The method of claim 1 further comprising:
applying image subtraction to define an initial shape of the visual hull.

9. The method of claim 1 further comprising:
acquiring a position image of a known background with another camera fixed to the camera to determine the position and pose of the camera.

10. The method of claim 4 wherein the field of views of the camera and the other camera are disjoint.

11. The method of claim 1, wherein the reducing further comprises:
selecting pixels located on the projected visual hull as seed pixels;
growing a region around each seed pixel, each region including neighboring pixels resembling the seed pixel, wherein the each pixel in the neighboring pixels satisfies predetermined resemblance criterion; and
reducing the visual hull in size according to the grown regions.

12. The method of claim 11, wherein the resemblance criterion is based on a gradient magnitude of the pixels.

13. The method of claim 1, in which the shape image is acquired by a handheld camera.

\* \* \* \* \*